United States Patent
Horak et al.

(10) Patent No.: US 11,901,708 B2
(45) Date of Patent: Feb. 13, 2024

(54) COOLING SYSTEM FOR AN AIR INSULATED SWITCHGEAR

(71) Applicant: ABB Schweiz AG, Baden (CH)

(72) Inventors: Jiri Horak, Rousinov (CZ); Emil Kalina, Brno (CZ)

(73) Assignee: ABB Schweiz AG, Baden (CH)

( * ) Notice: Subject to any disclaimer, the term of this patent is extended or adjusted under 35 U.S.C. 154(b) by 181 days.

(21) Appl. No.: 17/394,425

(22) Filed: Aug. 5, 2021

(65) Prior Publication Data

US 2022/0045486 A1 Feb. 10, 2022

(30) Foreign Application Priority Data

Aug. 6, 2020 (EP) .................... 20189854

(51) Int. Cl.
- *H02B 1/00* (2006.01)
- *H02B 1/56* (2006.01)
- *H02B 1/01* (2006.01)
- *H02B 1/46* (2006.01)

(52) U.S. Cl.
CPC ............. *H02B 1/565* (2013.01); *H02B 1/012* (2013.01); *H02B 1/46* (2013.01)

(58) Field of Classification Search
CPC ........... H02B 1/565; H02B 1/012; H02B 1/46
See application file for complete search history.

(56) References Cited

U.S. PATENT DOCUMENTS

| | | | | |
|---|---|---|---|---|
| 7,236,352 B2 * | 6/2007 | Dalis | ............... | H02B 13/025 361/678 |
| 7,586,738 B1 * | 9/2009 | Hartzel | ............... | H02B 13/025 361/676 |
| 10,049,837 B2 * | 8/2018 | Kingston | ............ | H02B 13/025 |
| 2009/0185333 A1 * | 7/2009 | Coomer | ............... | H02B 13/025 361/622 |

FOREIGN PATENT DOCUMENTS

| | | | |
|---|---|---|---|
| DE | 8915141 U1 | 2/1990 | |
| DE | 102012218782 A1 | 4/2014 | |
| FR | 2968439 A1 * | 6/2012 | ............. G08B 25/12 |
| JP | 63153706 U | 10/1988 | |

OTHER PUBLICATIONS

European Search Report, EP 20 189 854.1, dated Jan. 28, 2021, from the European Patent Office.

* cited by examiner

*Primary Examiner* — Pete T Lee
(74) *Attorney, Agent, or Firm* — Leydig, Voit & Mayer, Ltd.

(57) ABSTRACT

A cooling system for an air insulated switchgear compartment includes: a housing; a fan; and a flap. The fan is mounted to the housing. The flap is mounted to the housing. The flap is positioned adjacent to the fan such that a rotational axis of the fan does not extend through the flap.

10 Claims, 2 Drawing Sheets

COOLING SYSTEM FOR AN AIR INSULATED SWITCHGEAR

CROSS-REFERENCE TO PRIOR APPLICATION

Priority is claimed to European Patent Application No. EP 20 189 854.1, filed on Aug. 6, 2020, the entire disclosure of which is hereby incorporated by reference herein.

FIELD

The present invention relates to a cooling system for an air insulated switchgear and to a compartment for an air insulated switchgear.

BACKGROUND

Medium voltage (MV) air insulated switchgear (AIS), also called panels, require cooling and this is presently carried out with radial fans that are bulky and expensive, and that are also noisy and have limited lifetimes.

With respect to the Internal arc classification (IAC) requirements, the compartment or compartments of the air insulated switchgear also require that air flow paths are protected from hot gases and particle flow in the case of internal arc fault.

There is a need to provide a better cooling solution for an insulated switchgear, but also meets IAC requirements.

SUMMARY

In an embodiment, the present invention provides a cooling system for an air insulated switchgear compartment, the cooling system comprising: a housing; a fan; and a flap, wherein the fan is mounted to the housing, wherein the flap is mounted to the housing, and wherein the flap is positioned adjacent to the fan such that a rotational axis of the fan does not extend through the flap.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
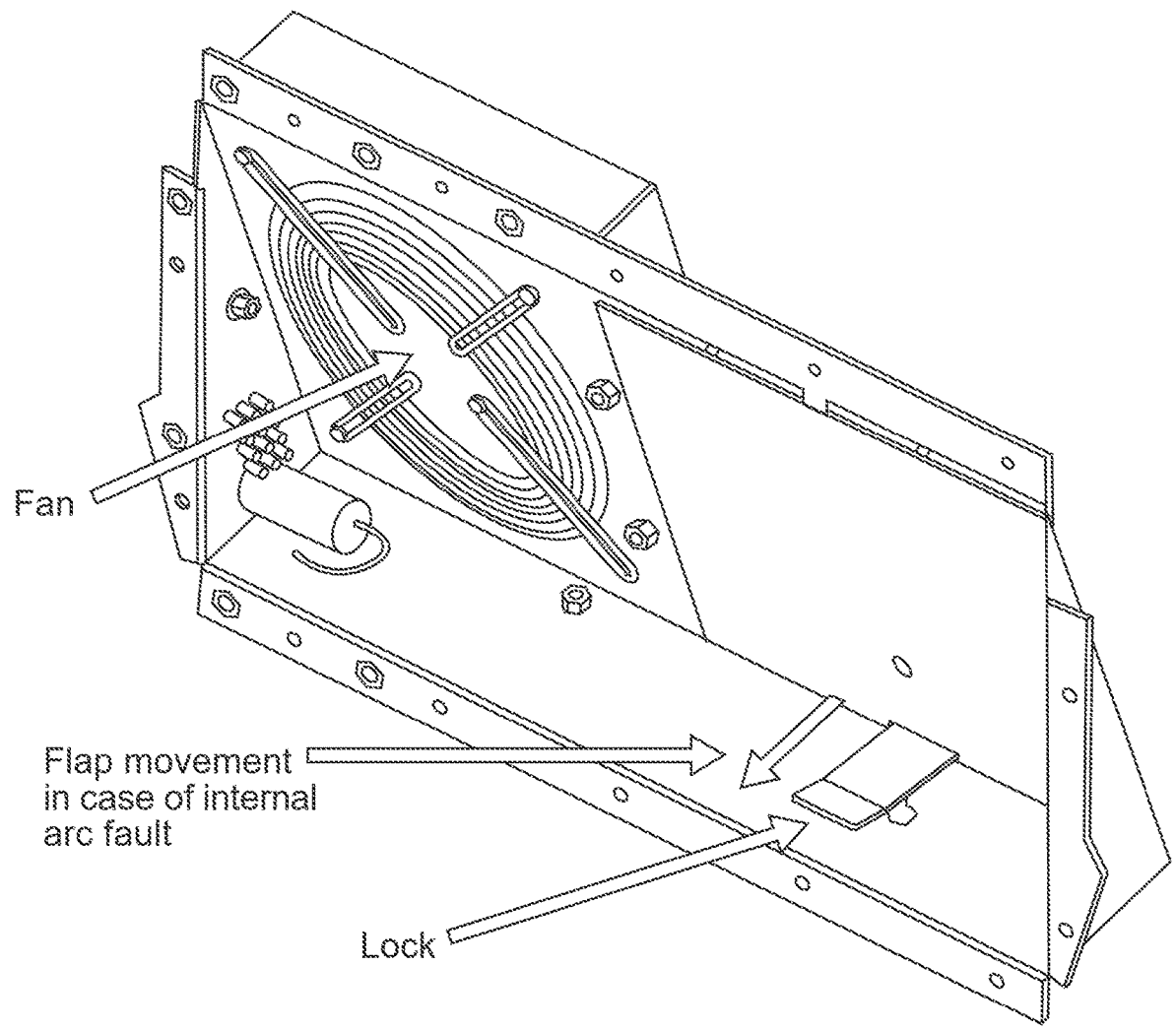
FIG. 1 shows an example of a cooling system and/or section of a compartment wall with an axial fan with a lateral or side flap.

In an embodiment, the present invention provides an improved cooling mechanism for an insulated switchgear that also meets IAC requirements.

In a first aspect, there is provided a cooling system for an air insulated switchgear compartment. The cooling system comprises:
 a housing;
 a fan; and
 a flap.

The fan is mounted in the housing. The flap is mounted in the housing. The flap is positioned adjacent to the fan, such that a rotational axis of the fan does not extend through the flap.

In an example, the flap is configured to open and close.

In an example, the flap is configured to move from an open position to a closed position due to a pressure difference from one side of the flap to the other side of the flap.

In an example, a control spring is configured to set a flap threshold pressure for the flap with respect to the pressure difference that will move the flap from the open position to the closed position.

In an example, the flap comprises a lock configured to hold the flap in a closed position.

In an example, the cooling system is configured such that gas and/or air cannot pass from one side of the housing to the other side of the housing directly through the fan along the rotational axis of the fan.

In an example, the cooling system comprises a box mounted to the housing, wherein the box is open on one side to the fan and wherein the rotational axis of the fan extends through a wall of the box.

In an example, the box is mounted to the housing to create a substantially air tight seal around one side of the fan.

In a second aspect, there is provided a compartment for an air insulated switchgear compartment. The compartment comprises:
 a fan; and
 a flap.

The fan is mounted to a wall of the compartment. The flap is mounted to the wall of the compartment. The flap is positioned adjacent to the fan, such that a rotational axis of the fan does not extend through the flap.

In an example, the flap is configured to open and close.

In an example, the flap is configured to move from an open position to a closed position due to a pressure difference between the inside of the compartment and the outside of the compartment.

In an example, a control spring is configured to set a flap threshold pressure for the flap with respect to the pressure difference that will move the flap from the open position to the closed position.

In an example, the fan and flap are configured such that gas and/or air cannot pass from inside the compartment to outside the compartment or from outside the compartment to inside the compartment directly through the fan along the rotational axis of the fan.

In an example, the cooling system comprises a box mounted to the wall of the compartment, wherein the box is open on one side to the fan and wherein the rotational axis of the fan extends through a wall of the box.

In an example, the box is mounted to the wall of the compartment to create a substantially air tight seal around one side of the fan.

The above aspects and examples will become apparent from and be elucidated with reference to the embodiments described hereinafter.

Figure 2:
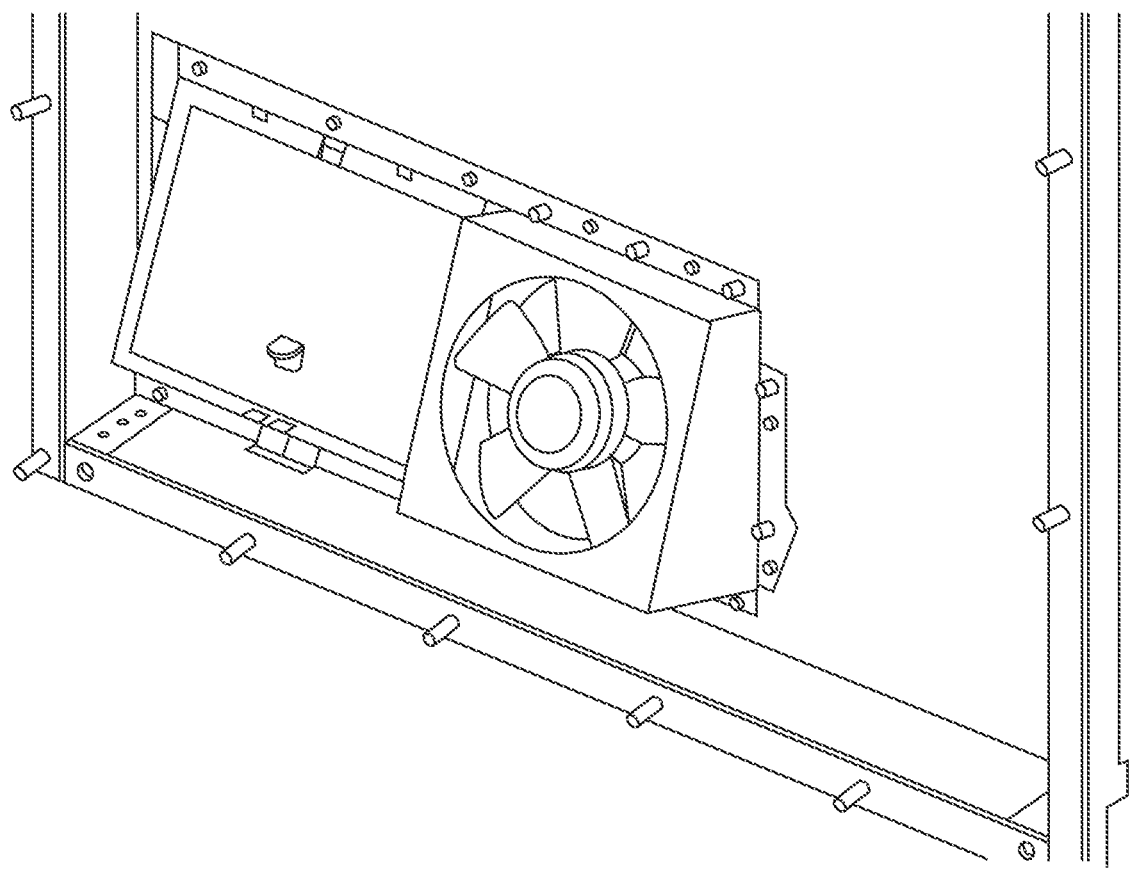
FIG. 2 shows an example of a compartment wall with an axial fan with a lateral or side flap, shown from inside and outside the compartment.
Figure 2:
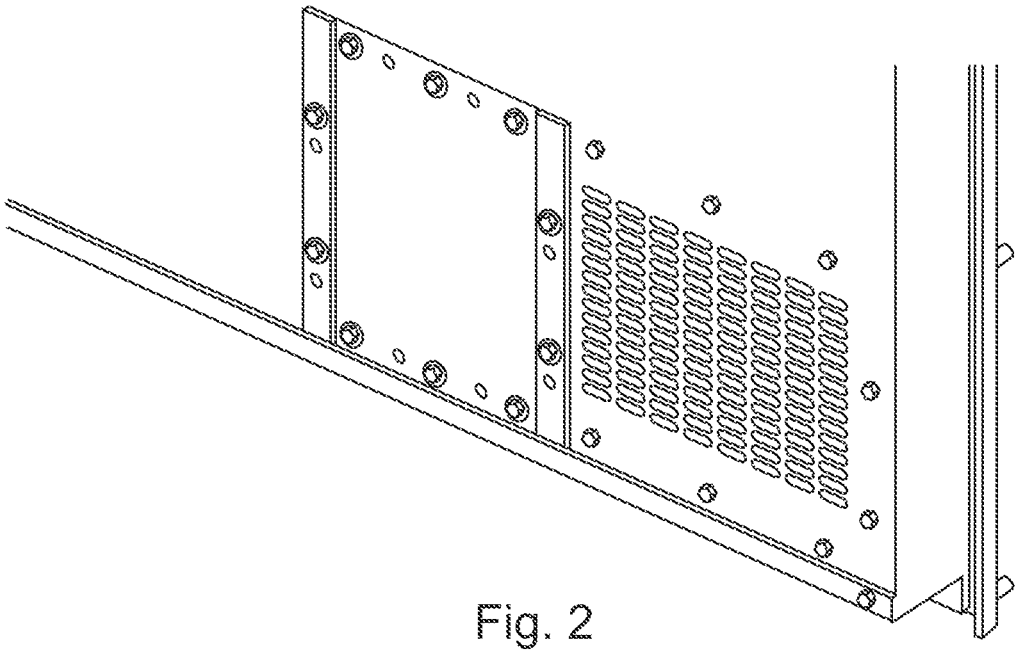

FIGS. 1-2 show examples of a new design of air insulated switchgear cooling in the form of an axial fan with a lateral or side flap that also meets IAC requirements in case of internal arc faults. The axial fan and lateral/side flap can come in a housing forming a cooling system that can be retrofitted to a compartment of an air insulated switchgear. Or the axial fan and lateral/side flap can be inserted into a wall of a compartment of an AIS.

The cooling system for an air insulated switchgear compartment comprises:

a housing;
a fan; and
a flap.

The fan is mounted to the housing. The flap is mounted to the housing. The flap is positioned adjacent to the fan, such that a rotational axis of the fan does not extend through the flap.

According to an example, the flap is configured to open and close.

According to an example, the flap is configured to move from an open position to a closed position due to a pressure difference from one side of the flap to the other side of the flap.

According to an example, a control spring is configured to set a flap threshold pressure for the flap with respect to the pressure difference that will move the flap from the open position to the closed position.

According to an example, the flap comprises a lock configured to hold the flap in a closed position.

According to an example, the cooling system is configured such that gas and/or air cannot pass from one side of the housing to the other side of the housing directly through the fan along the rotational axis of the fan.

According to an example, the cooling system comprises a box mounted to the housing, wherein the box is open on one side to the fan and wherein the rotational axis of the fan extends through a wall of the box.

According to an example, the box is mounted to the housing to create a substantially air tight seal around one side of the fan.

The compartment for an air insulated switchgear compartment comprises:
a fan; and
a flap.

The fan is mounted to a wall of the compartment. The flap is mounted to the wall of the compartment. The flap is positioned adjacent to the fan, such that a rotational axis of the fan does not extend through the flap.

According to an example, the flap is configured to open and close.

According to an example, the flap is configured to move from an open position to a closed position due to a pressure difference between the inside of the compartment and the outside of the compartment.

According to an example, a control spring is configured to set a flap threshold pressure for the flap with respect to the pressure difference that will move the flap from the open position to the closed position.

In an example, a lock is configured to hold the flap in a closed position.

According to an example, the fan and flap are configured such that gas and/or air cannot pass from inside the compartment to outside the compartment or from outside the compartment to inside the compartment directly through the fan along the rotational axis of the fan.

According to an example, the cooling system comprises a box mounted to the wall of the compartment, wherein the box is open on one side to the fan and wherein the rotational axis of the fan extends through a wall of the box.

According to an example, the box is mounted to the wall of the compartment to create a substantially air tight seal around one side of the fan.

The wall of the compartment can for example be a real wall.

Thus, a radial fan with a flap the gases go through the fan and then through the flap behind the fan, is replaced with an axial fan with a lateral flap.

The axial fan is smaller and cheaper than existing fan solutions, and indeed rather than one fan as described above, two fans can be used for backup.

New assembly also provides for easier fan replacement.

The side or lateral flap is directly closed by hot gas pressure, bypassing the fan, resulting in faster reaction times with respect to closure of the flap.

Thus, in the situation where an internal arc fault occurs and hot gases and increase pressure occurs inside a compartment, the flap is operated and moved from an open position to a closed position directly by the hot gas pressure where such hot gas has not had to move through the fan in closing the flap. This results in higher speed of operation and high reliability, in that protection is provided against lower energy arcs than existing systems.

Thus, the new development provides for improved IAC performance, increased speed of operation, increased lifetime, lower costs, lower noise, and improved closure tightness.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A cooling system for an air insulated switchgear compartment, the cooling system comprising:
   a housing;
   a fan; and
   a flap,
   wherein the fan is mounted to the housing,
   wherein the flap is mounted to the housing,
   wherein the flap is positioned adjacent to the fan such that a rotational axis of the fan does not extend through the flap,
   wherein the flap is configured to move from an open position to a closed position due to a pressure difference from one side of the flap to the other side of the flap, and
   wherein the cooling system is configured such that gas and/or air cannot pass from one side of the housing to the other side of the housing directly through the fan along the rotational axis of the fan.

2. The cooling system of claim 1, further comprising:
a control spring configured to set a flap threshold pressure for the flap with respect to the pressure difference so as to move the flap from the open position to the closed position.

3. The cooling system of claim 1, wherein the flap comprises a lock configured to hold the flap in the closed position.

4. The cooling system of claim 1, further comprising:
a box mounted to the housing,
wherein the box is open on one side to the fan, and
wherein the rotational axis of the fan extends through a wall of the box.

5. The cooling system of claim 4, wherein the box is mounted to the housing to create a substantially air tight seal around one side of the fan.

6. A compartment for an air insulated switchgear compartment, the compartment comprising:
a fan; and
a flap,
wherein the fan is mounted to a wall of the compartment,
wherein the flap is mounted to the wall of the compartment,
wherein the flap is positioned adjacent to the fan such that a rotational axis of the fan does not extend through the flap,
wherein the flap is configured to move from an open position to a closed position due to a pressure difference between the inside of the compartment and the outside of the compartment; and
wherein the fan and the flap are configured such that gas and/or air cannot pass from inside the compartment to outside the compartment or from outside the compartment to inside the compartment directly through the fan along the rotational axis of the fan.

7. The compartment of claim 6, further comprising:
a control spring configured to set a flap threshold pressure for the flap with respect to the pressure difference so as to move the flap from the open position to the closed position.

8. The compartment of claim 6, further comprising:
a box mounted to the wall of the compartment,
wherein the box is open on one side to the fan, and
wherein the rotational axis of the fan extends through a wall of the box.

9. The compartment of claim 8, wherein the box is mounted to the wall of the compartment to create a substantially air tight seal around one side of the fan.

10. The compartment of claim 6, further comprising:
an air exchange portion mounted to the wall of the compartment, the air exchange portion being positioned behind the flap and adjacent to the fan such that the rotational axis of the fan does not extend through the flap,
wherein the fan is configured to exchange air and/or gas through the air exchange portion.

\* \* \* \* \*